Feb. 21, 1961 — P. S. HESS — 2,972,553
NYLON COATING METHOD
Filed April 1, 1957
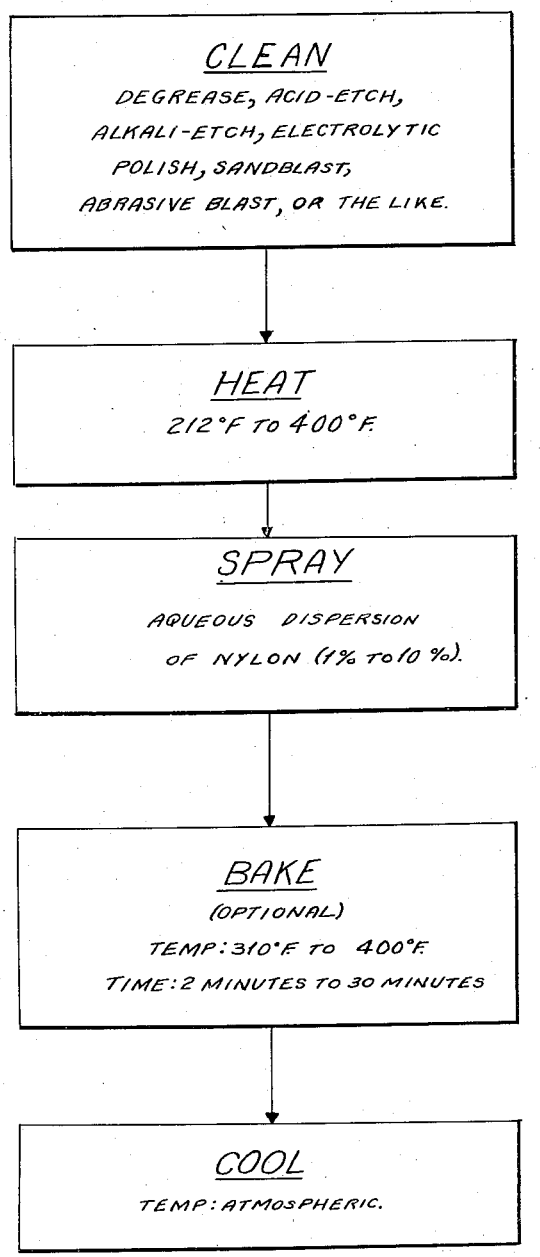

United States Patent Office 2,972,553
Patented Feb. 21, 1961

2,972,553
NYLON COATING METHOD

Paul S. Hess, West Orange, N.J., assignor to General Plastics Corporation, Passaic, N.J., a corporation of New Jersey Filed Apr. 1, 1957, Ser. No. 649,711

7 Claims. (Cl. 117—47)

My invention relates to a nylon coating method and more particularly to a method of coating surfaces of metal, ceramics, glass, porcelain, wood, plastics, and other objects whose surface may be heated to above the boiling point of water, with a tough, adhering, homogeneous film of nylon.

Coatings of nylon have many uses. On metal they not only protect the metal from corrosion but enable metal containers, for example, to be used for holding alkalies and other corrosive liquids or substances. Surfaces coated with nylon show remarkable abrasion resisting properties. The coating of copper or silver, for example, with nylon will preserve the lustrous appearance of the surface. Glass coated with nylon will prevent fragments from flying in the event it becomes broken. Dyes and pigments may be added to give various effects.

The advantages of nylon coatings are known to the art and attempts have been made to apply coatings. These attempts have been only partially successful. One method of applying nylon coatings is to preheat the surface to be coated to a temperature above the fusion point of nylon molding powder, that is to a temperature between 410° F. and 420° F. Nylon is composed of polyamides and these have varying heat resistance depending on their particular compositions. In general, if the polyamides are cut, chopped or ground into small particles of sufficient fineness, the nylon particles can be fluidised by means of gases. This phenomenon of fluidising finely divided solids is well known to the art and is used to transport coal and to form fluidised beds of catalysts for chemical reactions. A fluidised finely divided solid will act physically as a liquid. The heated article is plunged into the vessel containing fluidised molding powder. The heat will fuse the nylon powder and form a coating. This method results in coatings of great unevenness owing to the fact that the thickness of the coating will depend upon the thickness of the heated material being coated. If the cross-sectional depth is small the quantum of heat is small and the coating will be thin. If the cross-sectional depth is thick in a particular area the coating of nylon will be correspondingly thick.

It will also be understood that fluidised techniques require expensive equipment and a large quantity of finely divided molding powder, besides a source for the fluidising gas. Then too many objects cannot be heated to temperatures high enough to fuse the nylon without deleteriously affecting the objects.

Nylon is also produced in the form of a soluble resin. One such soluble resin is known as "Zytel" nylon resin. This is a synthetic resin in the form of cream colored cubes composed of alcohol soluble polyamides having an unusual combination of properties, including toughness, flexibility, high elongation and excellent resistance to most solvents, including aliphatic and aromatic hydrocarbons, as well as to alkalies and oxygen containing gases. Whenever "nylon" is used in this specification it shall mean a group of synthetic plastics which are long-chain polymer amides in which the amide groups form an integral part of the main polymer chain and which have the characteristic that when formed into a filament the structural elements are oriented in the direction of the axis.

Attempts have been made to coat articles with dispersions of nylon. These have met with little success owing to the fact that the alcohol solvent evaporates very rapidly. The result has been the production of an uneven film caused by bubbles, spider-webbing and poor adhesion. The use of an alcohol solvent, furthermore, produces a fire hazard or explosion risk requiring the use of special preventative measures and apparatus.

I have discovered that surfaces may be advantageously coated with a nylon film in a manner to obtain excellent adhesion and good abrasion resistance while avoiding all of the defects of the methods of the prior art.

One object of my invention is to provide a novel method of coating surfaces with a tough, adherent film of nylon.

Another object of my invention is to provide a simple and expeditious method of coating surfaces of objects which can be heated, such as steel, iron, nickel, chromium, copper, aluminum, silver and zinc, as well as ceramic surfaces, glass surfaces, porcelain surfaces, wood surfaces, plastic surfaces, and the like, with a tough, adherent film of nylon.

Another object of my invention is to provide a method of coating a surface with a tough, adherent film of nylon using an aqueous dispersion of nylon.

Other and further objects of my invention will appear from the following description.

The accompanying drawing is a schematic view showing the steps of my process.

In general my invention contemplates cleaning the surface to be coated. Any appropriate cleaning method may be employed depending upon the nature of the material which forms the surface to be coated. After this the surface is heated to above the boiling point of water. While the surface is heated an aqueous dispersion of nylon is sprayed on the surface at a rate which will permit the continuous flashing off of water vapor from the surface to leave a film of nylon. It will be found that a tough, adhering film of nylon will be formed.

This film, however, will be somewhat dull in appearance. If the surface is then heated to a temperature between 309° F. and 400° F. the surface will become glossy.

More particularly, an aqueous dispersion of nylon, preferably one formed by the process described in my copending application Ser. No. 547,095, filed November 16, 1955, is the dispersion which I employ. Any appropriate concentration of nylon may be employed. By my method of forming aqueous dispersions of nylon I may achieve concentrations as high as 25%. This concentration is too high for most uses. Similarly nylon in a concentration as small as 0.1% may be dispersed. This concentration is generally too small. For most uses aqueous dispersions containing a concentration of nylon between 1% and 10% are satisfactory. It will be understood, of course, that the lower the concentration of nylon in the dispersion the thinner will be the film of nylon formed. The higher the concentration of nylon in the dispersion the thicker will be the film. It is understood that the nylon dispersion may contain any appropriate dye to give the finished coating a desired color.

While I have attained coatings having excellent adhesion without cleaning in some cases, I prefer for uniform results to practice a cleaning step.

The surface to be coated is first cleaned. Any appropriate cleaning method may be employed. The surface may be degreased by usual solvents. It may be etched by means of acids or alkalies. If the surface is metal it may be polished electrolytically. The surface may be sand-blasted or subjected to a blast of an abrasive, such as finely divided aluminum oxide. The cleaning of the surface is an important step since foreign matter such as grease, dust, or the like, will deleteriously affect the smoothness of the coating and its adherence.

The surface is then heated under atmospheric conditions to a temperature between the boiling point of water, that is 212° F., and 400° F. If the temperature is in excess of 400° F. blistering will occur during the spraying step of the process. If the temperature is below the boiling point of water a tacky film of comparatively poor adhesion will result. The salient feature of my process is that the temperature be sufficiently high and maintained sufficiently high to cause the water in the aqueous dispersion of nylon to be flashed off of the surface. It will be understood by those skilled in the art that a temperature of less than 212° F. can be used if the process is carried out under sub-atmospheric pressure.

Any appropriate mode of heating may be employed. If the surface is part of an article having a wall of sufficient thickness the article may be placed in an oven and soaked at an elevated temperature until it is uniformly heated. The article will then have sufficient sensible heat to enable my process to be carried out, that is when it is sprayed with an aqueous dispersion of nylon the water will be flashed off of the surface and the temperature all during the spraying step will be at or above the boiling point of water. If the surface is that of a thin wall, heating means such as a radiant heater, resistant heating, flame heating, microwave heating, or the like, will have to be employed to supply sufficient heat during the spraying process to maintain the surface at a temperature at or above the boiling point of water.

After the surface is at the proper temperature and is being maintained at this temperature the aqueous solution of nylon is applied to the surface, preferably by means of an appropriate atomizer, in the form of a fine spray. Here again the mode of application may be any appropriate type. The salient feature of my process is that the aqueous dispersion of nylon be supplied in such a manner that the water may be flashed off in the form of steam as the dispersion is applied to the surface. The rate of applying the spray cannot be sufficiently rapid to cool the surface to below the boiling point of water. This requires finely divided droplets or particles of the aqueous dispersion so that the liquid may be sprayed in finely divided form over a wide area to permit the water to flash off. If the droplets be too coarse and the rate of application is too rapid the temperature of the surface will be cooled to below the boiling point of water and an uneven, undesirable, tacky, poorly adhering coating will result.

I have not been able to obtain results if I brush or otherwise apply the aqueous dispersions. It must be sprayed on and it must be sprayed on at a rate such that the surface is not cooled below the boiling point of water.

The temperature of the surface governs the rate of flashing off of water. The rate of flashing off of the water also has an effect on the thickness of the film deposited. Higher temperatures result in a more rapid flashing off of the water and a more rapid deposition of the film. With a temperature slightly above the boiling point of water and an aqueous dispersion of nylon containing 1% of nylon I have produced a film having a thickness of 0.2 mil. With an aqueous dispersion of 10% of nylon and a temperature of 395° F. I have produced a film 5 mils in thickness. It will be seen, therefore, that I can control the thickness of the film from a single application both by the temperature at which the surface is maintained and by the concentration of nylon in the dispersion.

By repeated applications a comparatively thick film can be built up. I have been successful in achieving a film of 25 mils in thickness from six successive applications followed by intermediate heating. Beyond this it is difficult to go with good results. The nylon film is a poor conductor of heat and it is difficult to maintain a surface temperature sufficiently high to permit the flashing off of water vapor when the film becomes thick.

If the temperature is maintained below the range of about 310° F. to 320° F., depending upon the particular composition of the polyamide used (which composition it is understood varies slightly from batch to batch) the appearance of the finished film will be dull, that is it will not reflect a large percentage of light. If a glossy appearance is desired, that is one which reflects a larger percentage of light, this can be readily achieved by baking the surface at a temperature between 310° F. and 400° F., that is above the fusion point of nylon but below the point at which the surface is deleteriously affected. The baking changes the dull film into a film having a glossy appearance. An optimum temperature for the baking is about 350° F. and optimum time is 15 minutes. Shorter times may be used with higher temperatures and longer times may be required with lower temperatures. At 310° F. to 320° F. the baking should be for about 30 minutes or more to achieve a glossy surface. At a temperature of around 400° F. the baking may take place in a very rapid time in the order of several minutes.

After the baking step has been completed the finished piece should be allowed to cool to atmospheric temperature. The time involved will depend, of course, on the thickness of the wall whose surface is coated. If rapid cooling is desired the piece may be quenched with any appropriate cooling medium, such as cool air or liquid.

Coatings can be obtained if slightly less than all of the water has been flashed off. These coatings will not be as good as those in which the water is flashed off. The residual moisture, if any, is removed during the baking step if this is undertaken, or during the cooling step if this is permitted to occur gradually. Accelerated cooling of a piece having a coating containing some residual moisture will result in a somewhat tacky film.

A coating formed by my progress will be a tough, adhering film of remarkable homogeneity and hardness. I tested the adhesion of my film with an adhesion tester developed by the Bell Telephone Laboratories and manufactured by the Mutual Electronic Industries Corporation of New Rochelle. This adhesion tester is well known to the art for coating evaluation work, particularly for testing the adhesion of paints. In every case my coatings showed adhesion beyond the limits of the instrument. The instrument used applied a force of 1,000 grams to the contact element of the tester and in no case was the coating removed from the surface.

My method of applying nylon coatings operates not only for metals, ceramics, glass, porcelain and the like, but is also applicable for any surface which can be heated without harm to above the boiling point of water and maintained at this temperature during the application of a finely divided aqueous dispersion of nylon, that is during the spraying of a nylon dispersion onto the surface.

It will be seen that I have accomplished the objects of my invention. I have provided a method for applying a tough, adhering film of nylon to surfaces. My method enables me to apply a tough, adhering film of nylon to any surface which can be heated and maintained in a heated condition during a spraying step. My method provides a simple and expeditious mode of applying nylon to surfaces and controlling the thickness of the coating. My method enables me to employ an aqueous dispersion of nylon to avoid the disadvantages of having to employ the molding powders in fluidised techniques or alcoholic solutions of nylon.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A method of coating surfaces of solids which remain solids above the boiling temperature of water with nylon including the steps of heating the surface to a temperature above the boiling point of water and below 400° F., spraying a finely divided aqueous dispersion of nylon on said surface and maintaining the temperature of the surface above the boiling point of water during the spraying step, the temperature at which said surfaces are maintained being sufficiently high to flash off substantially all of the water from the aqueous dispersion and deposit a tough, adhering, homogeneous film of nylon thereon.

2. A method as in claim 1 in which the surface is cleaned prior to the spraying step.

3. A method as in claim 1 in which said coating step is followed by a baking step in which the surface is maintained at a temperature between 310° F. and 400° F. for a period of between 2 minutes and 30 minutes.

4. A method of coating a surface of a solid which remains solid above the boiling temperature of water with nylon including the steps of cleaning the surface to be coated, heating the surface to be coated to a temperature between the boiling point of water and 400° F., spraying an aqueous dispersion of nylon upon said heated surface, maintaining the surface above the boiling point of water during said spraying step, the temperature at which said surface is maintained being sufficiently high to flash off substantially all of the water from said aqueous dispersion of nylon and deposit a film of nylon on said surface, baking said surface at a temperature between 310° F. and 400° F. for a short time period, and then permitting said surface to cool to atmospheric temperature.

5. A method of coating a surface of a solid which remains solid above the boiling temperature of water with nylon including the steps of heating the surface to be coated to a temperature above the boiling point of water, spraying an aqueous dispersion of nylon upon said heated surface, maintaining the surface above the boiling point of water during the spraying step, the temperature at which said surface is maintained being sufficiently high to flash off substantially all of the water from said aqueous dispersion of nylon and deposit a layer of nylon upon said surface and then baking said nylon at a temperature above its fusion point.

6. A method of coating a surface of a solid which remains solid above the boiling temperature of water with nylon including the steps of cleaning the surface to be coated, heating said surface to a temperature above the boiling point of water, spraying an aqueous dispersion of nylon upon said heated surface, maintaining the surface above the boiling point of water during the spraying step, the temperature at which said surface is maintained being sufficiently high to flash off substantially all of the water from said aqueous dispersion of nylon and deposit a layer of nylon upon said surface and then baking said nylon at a temperature above its fusion point.

7. A method of coating a surface of a solid which remains solid above the boiling temperature of water with nylon including the steps of cleaning the surface to be coated, heating said surface to a temperature above the boiling point of water, spraying an aqueous dispersion of nylon upon said heated surface, maintaining the surface above the boiling point of water during the spraying step, the temperature at which said surface is maintained being sufficiently high to flash off substantially all of the water from said aqueous dispersion of nylon and deposit a layer of nylon upon said surface, baking said nylon at a temperature above its fusion point, and then permitting the surface to cool to atmospheric temperature.

References Cited in the file of this patent

UNITED STATES PATENTS

| | | |
|---|---|---|
| 665,747 | Martin | Jan. 8, 1901 |
| 1,033,912 | Lendi | July 30, 1912 |
| 1,780,566 | Pedersen | Nov. 4, 1930 |
| 2,359,878 | Schupp | Oct. 10, 1944 |
| 2,495,283 | Werntz | Jan. 24, 1950 |
| 2,657,153 | Russel | Oct. 27, 1953 |
| 2,661,307 | Foster | Dec. 1, 1953 |
| 2,714,097 | Watson et al. | July 26, 1955 |
| 2,728,686 | Bornshko | Dec. 27, 1955 |
| 2,731,432 | Toulmin | Jan. 17, 1956 |
| 2,763,569 | Bradstreet | Sept. 18, 1956 |
| 2,861,897 | Hendrixson | Nov. 25, 1958 |